(12) United States Patent
Jacoby et al.

(10) Patent No.: US 10,877,994 B2
(45) Date of Patent: Dec. 29, 2020

(54) IDENTIFIER BASED DATA REPLICATION

(71) Applicant: salesforce.com, inc., San Francisco, CA (US)

(72) Inventors: Geoffrey John Jacoby, Emeryville, CA (US); Lars Hofhansl, Orinda, CA (US); Alex J. Araujo, Round Rock, TX (US)

(73) Assignee: salesforce.com, inc., San Francisco, CA (US)

( * ) Notice: Subject to any disclaimer, the term of this patent is extended or adjusted under 35 U.S.C. 154(b) by 571 days.

(21) Appl. No.: 15/452,374

(22) Filed: Mar. 7, 2017

(65) Prior Publication Data

US 2018/0260466 A1  Sep. 13, 2018

(51) Int. Cl.
*G06F 16/27* (2019.01)
*G06F 11/14* (2006.01)

(52) U.S. Cl.
CPC ........ *G06F 16/275* (2019.01); *G06F 11/1451* (2013.01); *G06F 11/1456* (2013.01); *G06F 11/1464* (2013.01); *G06F 16/27* (2019.01); *G06F 2201/80* (2013.01)

(58) Field of Classification Search
CPC .. G06F 11/1451; G06F 11/1469; G06F 16/27; G06F 16/128; G06F 16/1748; G06F 16/178; G06F 16/2282; G06F 16/2358; G06F 16/273; G06F 16/182; G06F 16/1844; G06F 16/116; G06F 16/125; G06F 16/16; G06F 16/1774; G06F 16/183; G06F 16/21; G06F 16/14; G06F 16/184; G06F 16/185; G06F 16/1873; G06F 16/213; G06F 16/215; G06F 16/2246; G06F 16/2255; G06F 16/2329; G06F 16/2372; G06F 16/2453; G06F 16/275; G06F 16/283; G06F 16/285; G06F 16/9027; G06F 11/1456; G06F 11/1464; G06F 2201/80
USPC .......................................................... 707/634
See application file for complete search history.

(56) References Cited

U.S. PATENT DOCUMENTS

| | | | |
|---|---|---|---|
| 2010/0198791 A1* | 8/2010 | Wu ...................... | G06F 11/1451 707/644 |
| 2011/0213754 A1* | 9/2011 | Bindal ................ | G06F 11/1453 707/641 |
| 2011/0258179 A1* | 10/2011 | Weissman ......... | G06F 16/24544 707/714 |
| 2014/0181579 A1* | 6/2014 | Whitehead .......... | G06F 11/1451 714/15 |
| 2015/0112929 A1* | 4/2015 | Quakkelaar ........... | G06F 16/182 707/615 |
| 2018/0218025 A1* | 8/2018 | Rasmussen ............ | G06Q 40/12 |

* cited by examiner

*Primary Examiner* — Alford W Kindred
*Assistant Examiner* — Cecile H Vo
(74) *Attorney, Agent, or Firm* — Holland & Hart LLP

(57) ABSTRACT

A database system may store data at a primary database and replicate the data to one or more disaster recover (DR) databases. The database system may determine which DR database to use for data replication based on an identifier of the data. A method for data storage may include receiving and storing a first data block and a second data block at a first database server. The method may further include transmitting a first backup request for the first data block to a second database server based on an identifier of the first data block and transmitting a second backup request for the second data block to a third database server based on an identifier of the second data block.

20 Claims, 10 Drawing Sheets

IDENTIFIER BASED DATA REPLICATION

FIELD OF TECHNOLOGY

The present disclosure relates generally to database systems and data storage, and more specifically to identifier based data replication.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may include a system of one or more databases to store data processed by the platform. The database system may be configured to store data at a primary database and replicate the data to one or more disaster recovery (DR) sites. In the case of multi-tenant database systems, managing where to store and replicate data for each tenant may be difficult due to the number of tenants, the dynamic addition and removal of tenants, the number of computer clusters involved, or a combination of these factors.

DETAILED DESCRIPTION

A database system may be configured to store data at a primary database and replicate the data to a secondary database at a different location for disaster recovery. The database system may be configured to store data associated with multiple different entities (e.g., tenants). In some cases, a multi-tenant database system may include several cloud-based databases (or data centers) located at several different locations (e.g., different cities, states, or countries). A database in one location may serve as a primary database for some data while serving as a disaster recover (DR) database for other data.

In the case of a multi-tenant database system, a database may serve as the primary database for a particular group of tenants. However, some tenants from the group may use one DR database while other tenants from the group may use a different DR database. To manage the replication of data from the primary database to these two different DR databases, the database system may be configured to use a separate computer cluster (e.g., a cluster of physical or virtual machines) for each group of tenants that share the same pair of primary and DR databases. However, setting up and running separate computer clusters for this purpose may result in the redundant use of computation and storage resources, which may lead to inefficiencies in the database system.

Moreover, tenants may dynamically join or leave the multi-tenant database system, or the system may migrate a tenant's data from one database to another for various reasons. As a result, the database system may be configured to continually keep track of the primary and DR databases for each tenant, which may add to the complexity of managing such multi-tenant database systems.

In accordance with aspects of the present disclosure, a database system may be configured to replicate data to a particular DR database based on a property or characteristic of the data itself. For example, the database system may determine from a particular block or row of data that the data belongs to a particular tenant (e.g., from a tenant identifier within the data row). Based on the identified tenant (or some other characteristic of the data itself), the database system may determine which DR database to use (e.g., based on a master list) and replicate the data for that tenant to the appropriate DR database. Managing the data replication in this way may allow data from multiple tenants to be processed at the primary database with a single cluster and replicated to different DR databases based on the data itself.

Aspects of the disclosure are initially described in the context of environments supporting data-driven replication. Aspects of the disclosure are further illustrated by and described with reference to apparatus diagrams, system diagrams, and flowcharts that relate to identifier based data replication.

Figure 1:
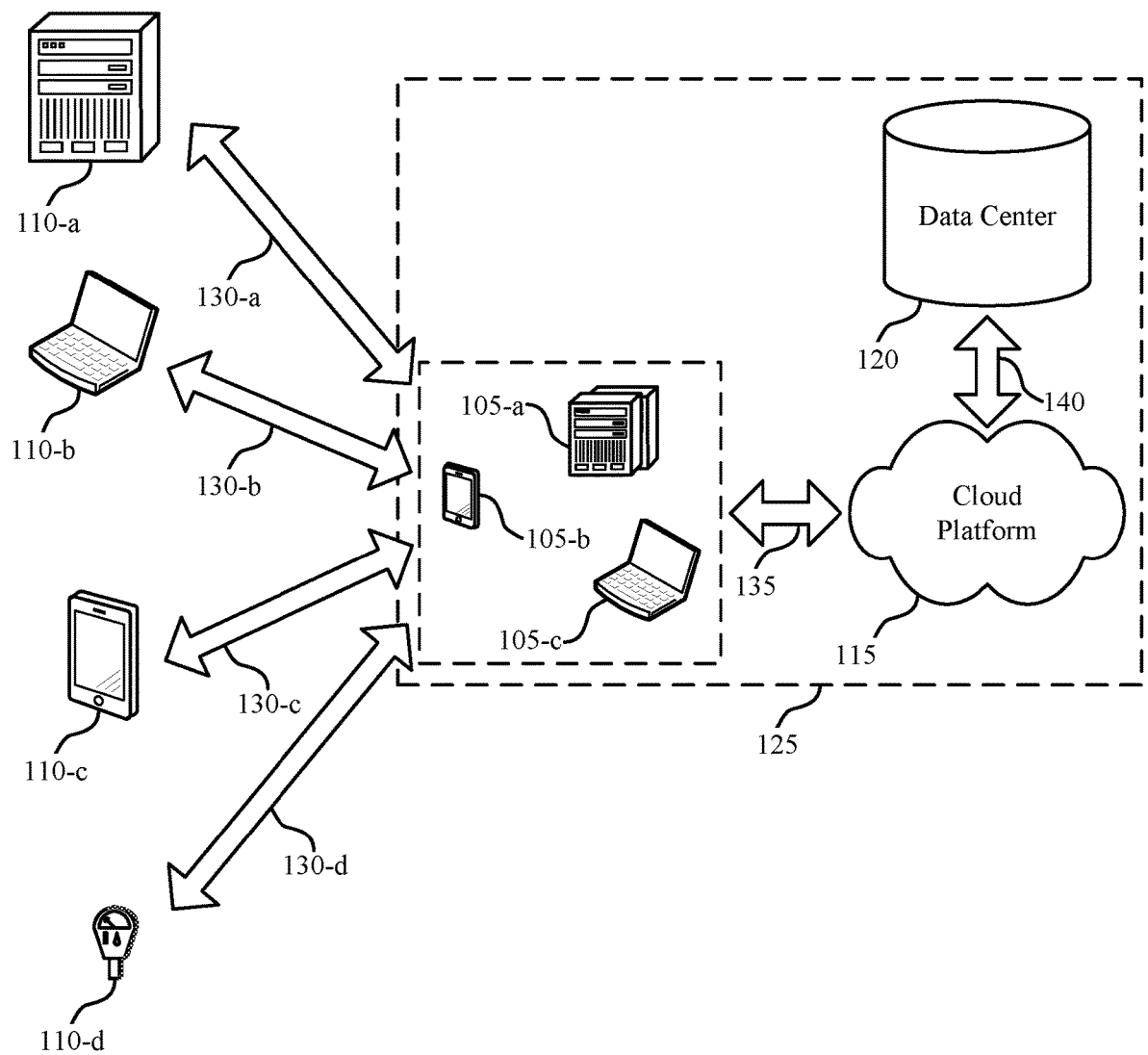
FIGS. 1 through 3 illustrate examples of environments for data storage that support identifier based data replication in accordance with aspects of the present disclosure.

FIG. 1 illustrates an example of an environment 100 for cloud computing that supports identifier based data replication in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

In some cases, data center 120 may be configured as a multi-tenant HBase database and receive data from multiple cloud clients 105. The data center 120 may serve as the primary database for a particular group of cloud clients 105 and may replicate the data to one or more DR databases. Some cloud clients 105 from the group may use one DR database while other cloud clients 105 from the group may use a different DR database. To manage the replication of data from the data center 120 to these two different DR databases, the data center 120 may send replicated versions of the data to a particular DR database based on an identifier of the data (e.g., a tenant identifier, which may specify the specific cloud client 105 the data is associated with). Accordingly, instead of using a separate server cluster for each group of cloud clients 105 that share a primary and DR database pair, the data center 120 may process data from multiple cloud clients 105 with a single server cluster.

Figure 2:
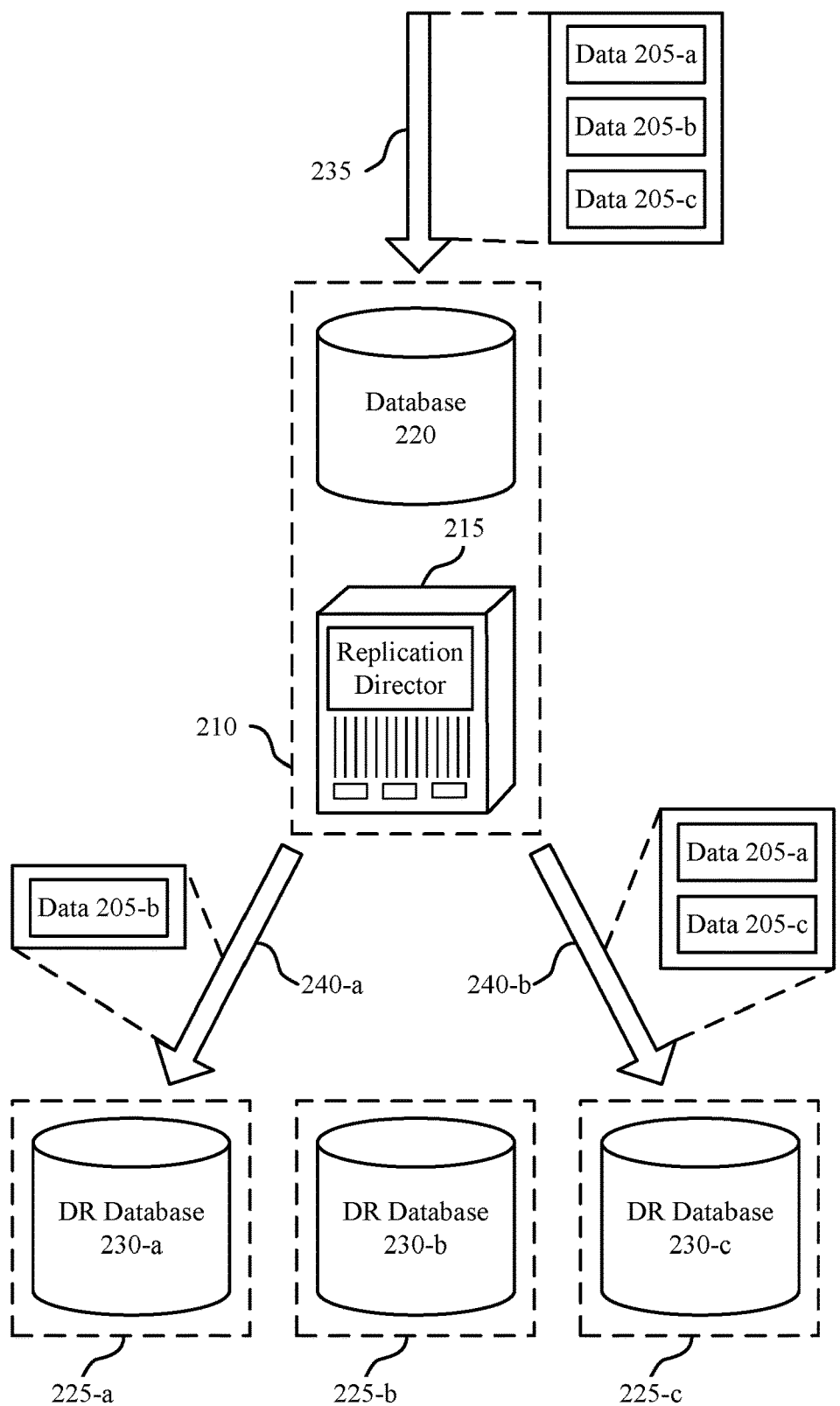

FIG. 2 illustrates an example of an environment 200 that supports identifier based data replication in accordance with various aspects of the present disclosure. The environment 200 may include a cluster 210, which may be a component of system 125 (e.g., a cluster within data center 120) as described with reference to FIG. 1. The cluster 210 may include a database 220 and a replication director 215. In some cases, the replication director 215 may be an example of a server, or it may be a component of the database 220. The environment 200 may additionally include multiple DR sites 225, which may each include one or more DR databases 230. In accordance with aspects of the disclosure, the cluster 210 may receive and store data 205 and may select a DR site 225 for data replication based on an identifier or some other characteristic of the data 205.

The cluster 210 may receive data 205 over communication link 235, and the database 220 may store the data 205. In some examples, the database 220 serves as a primary database for a particular tenant (e.g., client, organization, company) or group of tenants, but may serve as a DR database for a different tenant. The cluster 210 may include a group of physical machines (e.g., servers and devices for data storage, such as databases) or virtual machines interconnected to function as a single data processing system.

In some cases, the data 205, which may be referred to as a data block, may include a prefix and a data portion. The prefix may include identifier information, such as a tenant identifier, a security level identifier, a location of origin identifier, a timestamp, or any other identifying characteristic of a piece of data. The identifier information may be arranged so that it is the first information in the prefix. The database 220 may be configured to store the data 205 as key-value pairs. In some cases, the key of the key-value pair may include the prefix of the data 205 and the value of the key-value pair may include the data portion of the data 205. The key may be configured such that the identifier information is the first information listed in the key.

The identifier information may be used by the cluster 210 to determine which DR sites 225 to use for backing up the data 205. For example, the replication director 215 may include or otherwise access information correlating identifier information to the one or more DR sites 225. In some cases, the correlating information may be included in a lookup table, a hash function, an algorithm, or any other process for relating different identifier information with different DR sites 225. In a case where the identifier information is a tenant identifier, the replication director 215 may include a master list of tenants associated with one or more DR sites 225. In some examples, the replication director 215 may use the identifier information from the data 205 to choose a DR site 225 such that data corresponding with the identifier information is backed up at a geographically different location than the database 220. Additionally or alternatively, the identifier information may indicate a certain DR site 225 based on the privacy and data protection guidelines of the jurisdiction (e.g., country, region, etc.) of that DR site 225.

The cluster 210 may determine one or more DR sites 225 for transmission of an instance of the data 205 based on the identifier information. The cluster 210 may make the determination based on the correlating information (e.g., in a multi-tenant database system, a lookup table relating a tenant identifier with one or more DR sites 225). In some cases, a server (e.g., a replication director 215) associated with the cluster 210 may process the data 205, and more specifically the identifier information in the prefix of the data 205, and the correlating information to determine the one or more DR sites 225 to use for data replication for a particular block of data 205.

To replicate data to a DR site 225, the cluster 210 may transmit a backup request 240 to the chosen DR sites 225. The backup request 240 may include an instance of the data 205. This transmission may be referred to as a replication stream, and the instance of the data 205 may be an example of a replicated version of the data 205 that is stored in the primary database 220. The instance of the data 205 may be stored in the DR database 230 at the DR site 225. In some cases, a DR database 230 for one data block may be a primary database 220 for a second data block, and a primary database 220 for one data block may be a DR database 230 for a second data block.

A user may update the master list when a new tenants is added or removed. In other cases, the master list may dynamically update to include the changes to the tenants. A cluster 210 may periodically update the lookup table based on the master list in the database 220. In other cases, the user may directly modify the lookup table, the hash function, the algorithm, or another process for relating different identifier information with different DR sites 225.

In some cases, the cluster 210 may not be able to determine which DR site 225 to use for data replication based on identifier information of the data 205 because the master list may not be current. For example, in a case where the identifier information is a tenant identifier, the cluster 210 may receive data 205 associated with a new tenant. Information for the new tenant may not yet be indicated in correlating information within the cluster 210 (e.g., a lookup table). The cluster 210 may try to determine a DR site 225 to back up the data 205 at based on the lookup table, and may determine that the tenant identifier associated with the data 205 is not present in the lookup table. The cluster 210 may send the data 205 to multiple DR sites 225 based on the determination. For example, if a cluster 210 has three possible DR sites 225 for data replication, the cluster 210 may send the data 205 to all three DR sites 225.

In some cases, the cluster 210 may mark the data 205 with an indication that the tenant identifier was missing from the lookup table. After a threshold time, the cluster 210 may search the lookup table for the tenant identifier. Once the lookup table has been updated with the new tenant identifier, the cluster 210 may identify any DR sites 225 that the data 205 was written to that are not part of the one or more correlated DR sites 225 and may indicate the data 205 that should be removed. A DR site 225 may perform a cleanup process on a database 230 of the DR site 225 to delete the indicated data 205.

Implementing identifier based data replication in a database system may increase the efficiency of the database system. For example, with identifier based data replication, a single cluster 210 may backup different rows of data 205 at different DR sites 225 based on some identifying characteristic associated with the rows of data 205. This may reduce the number of clusters 210 required to handle data 205 in multi-tenant database systems, so more data 205 may be handled by the same groups of machines. Additionally, if a primary database 220 goes offline (e.g., due to a power outage), the processes normally performed by the primary database 220 may be performed at the DR sites 225 associated with data 205 in the primary database 220. As a result, the load normally on the primary database 220 is spread across multiple DR databases 230 within DR sites 225, rather than placed completely on one DR database 230.

In one example, a database system (e.g., HBase) may receive data 205 associated with different tenants at a single cluster 210. The tenant associated with different blocks of data 205 may be determined from some identifying characteristic of the data, as discussed above. For example, the data 205 may include two data blocks associated with Tenant A (e.g., data 205-*a* and data 205-*c*) and a data block associated with Tenant B (e.g., data 205-*b*). Tenant A may store backup data 205 in a DR site 225 located in one location based on the privacy or data protection guidelines for that jurisdiction (e.g., Tenant A may store replicated data 205 at DR site 225-*c* in Location A). Tenant B may backup data 205 at a DR site 225 in a different location based on privacy or data protection guidelines for Tenant B (e.g., DR site 225-*a* in Location B). In some cases, a DR site 225 may be associated with a particular tenant because the DR site 225 is located in a different geographic location than the primary database 220 for that tenant.

A user may input the tenants and the associated DR sites 225 into a master list stored in the cluster 210. The cluster 210 may receive the data 205 (i.e., data 205-*a*, 205-*b*, and 205-*c*) over communication link 235 and store it at a primary database 220 associated with the cluster 210. A replication director 215 within the cluster 210 may then determine one or more DR sites 225 to replicate the data 205 to based on a lookup table. The lookup table may update its information based on the master list. In some cases, the lookup table may include an indication that Tenant A data 205-*a* and 205-*c* should be backed up in Location A and an indication that Tenant B data 205-*b* should be backed up in Location B. Based on these indications, the cluster 210 may select the location of the DR sites 225 for the data 205 corresponding to the indicated locations.

In another example, the lookup table may indicate specific DR sites 225 (e.g., DR sites 225-*c* and 225-*a*) to replicate data 205 to for Tenant A and Tenant B. Once the cluster 210 has determined the DR sites 225 for Tenant A and Tenant B, the cluster 210 may transmit instances of the data 205 to the corresponding DR sites 225 over replication streams. For example, data 205-*a* and 205-*c* associated with Tenant A may have a replicated version sent to one or more DR sites 225 located in Location A, and data 205-*b* associated with Tenant B may have a replicated version sent to one or more DR sites 225 located in Location B. In some cases, the cluster 210 may be associated with another DR site 225 that is located in yet another jurisdiction (e.g., DR site 225-*b* in Location C).

Figure 3:
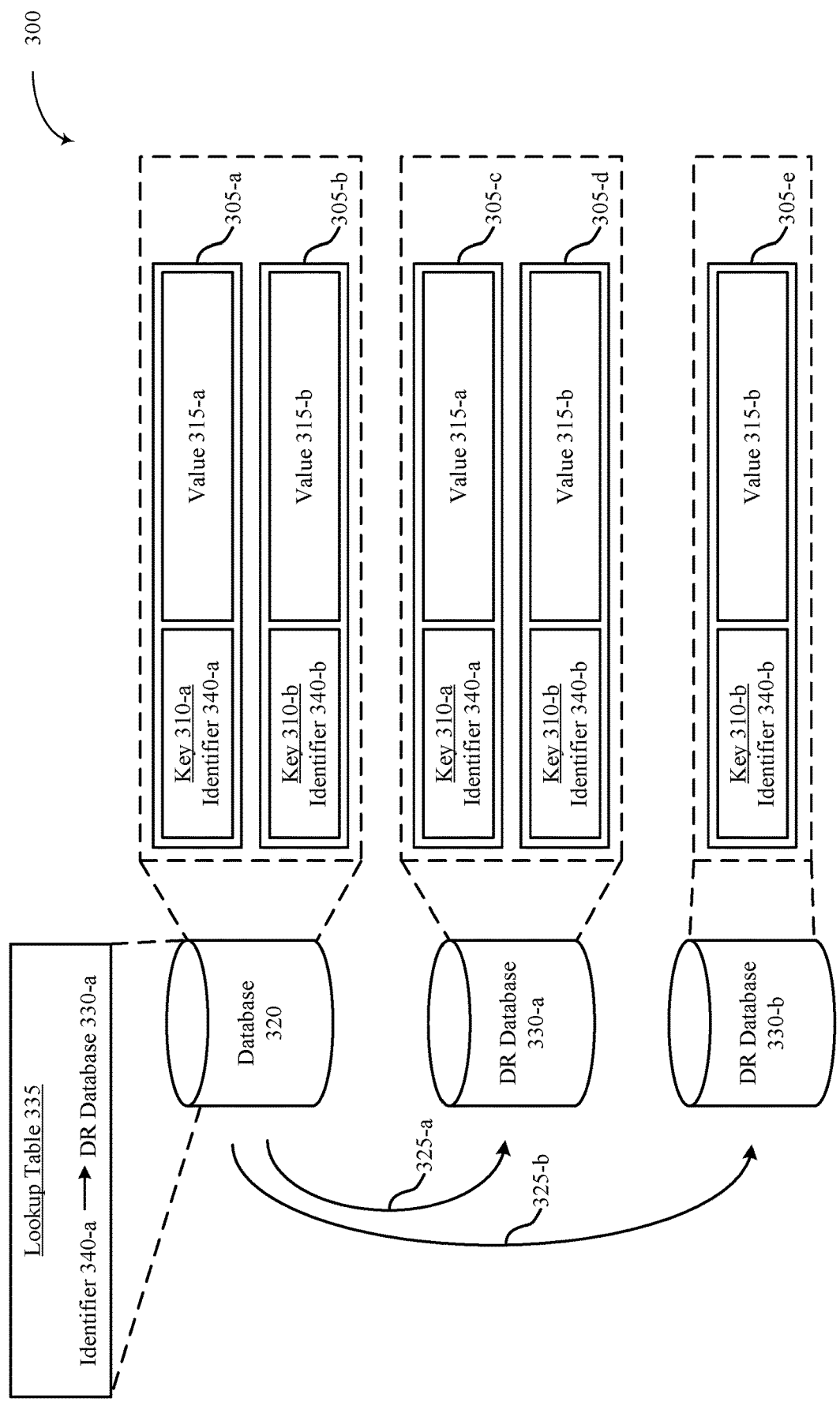

FIG. 3 illustrates an example of an environment 300 that supports identifier based data replication in accordance with various aspects of the present disclosure. Environment 300 may include database 320, which may be an example of a primary database such as database 220 as described with reference to FIG. 2. Database 320 may contain lookup table 335, which may map identifiers 340 to DR databases 330. Environment 300 may also include DR databases 330-*a* and 330-*b*, which may be examples of the DR databases 230 as described with reference to FIG. 2. In some cases, DR database 330-*a* and 330-*b* may also contain lookup tables, which may store the same identifier maps as lookup table 335. Database 320 and DR database 330-*a* and 330-*b* may each be components of different clusters, which may be located at different geographic locations. Database 320 may receive data, and based on an identifier 340 of the data, may replicate the data to either DR database 330-*a*, DR database 330-*b*, or both.

Database 320 may receive data, and may store the data in rows (e.g., data row 305-*a* and data row 305-*b*). The data rows 305 may be organized into key-value pairs. The key 310 of a key-value pair may contain a prefix of the data, and the value 315 of the key-value pair may contain a data portion of the data. For example, database 320 may receive two data blocks, each containing a prefix and a data portion. Database 320 may store the first data block in data row 305-*a*, with its prefix stored as key 310-*a* and its data portion stored as value 315-*a*. Similarly, database 320 may store the second data block in data row 305-*b*, with its prefix stored as key 310-*b* and its data portion stored as value 315-*b*.

A key 310 (e.g., a prefix) of a data block may contain one or more identifiers 340. For example, key 310-*a* may include identifier 340-*a*, and key 310-*b* may include identifier 340-*b*. In one case, identifier 340-*a* and 340-*b* may be examples of tenant identifiers, where identifier 340-*a* indicates a first tenant, and identifier 340-*b* indicates a second tenant. Although a tenant identifier is used as an example, it should be understood that any identifying characteristic of data may be used as an identifier 340.

Database 320 may include a function mapping some of these identifiers 340 to DR databases 330 or DR sites. For example, database 320 may include lookup table 335, which may contain a set of identifiers 340, where each identifier 340 indicates one of more DR databases 330. Lookup table 335 may include identifier 340-*a*, which may indicate DR database 330-*a*. Based on this indication in lookup table 335, database 320 may send an instance of the data contained in data row 305-*a* to DR database 330-*a* over replication stream 325-*a*. DR database 330-*a* may store the instance of the data in data row 305-*c*. Data row 305-*c* may contain a copy of the data stored in data row 305-*a* of database 320 (i.e., key 310-*a* and value 315-*a*). Additionally, database 320 may send an instance of lookup table 335 to DR database 330-*a*. In some cases, DR database 330-*a* may already store a version of lookup table 335, and database 320 may send an indication to DR database 330-*a* when lookup table 335 is modified. DR database 330-*a* may update the version of lookup table 335 based on the received indication.

In some cases when a new tenant is added to database 320, the lookup table 335 may not be current for some time and may therefore not contain an identifier 340 (e.g., identifier 340-*b*) for that tenant's data. In this case, database 320 may replicate the data in data row 305-*b* to both DR databases 330 associated with database 320. For example, database 320 may send the data in data row 305-*b* to DR database 330-*a* over replication stream 325-*a* and to DR database 330-*b* over replication stream 325-*b*. DR database 330-*a* may store the data in data row 305-*d*, and DR database 330-*b* may store the data in data row 305-*e*.

At a later time, database 320 may store identifier 340-*b* in lookup table 335, where identifier 340-*b* may indicate one or more DR databases 330 for data replication. Database 320 may send an updated instance of lookup table 335 to any associated DR databases 330 (e.g., DR database 330-*a* and 330-*b*). In some cases, a DR database 330 may search its lookup table for any data that is stored at the DR database 330 but that the DR database 330 does not own (i.e., where the DR database 330 is not indicated by an identifier 340 associated with the tenant for the data in the lookup table). The DR database 330 may perform the search periodically, based on an indication from database 330, based on updating its lookup table, or based on a combination of these factors. The DR database 330 may determine whether the data for the tenant is owned by at least two other databases (e.g., database 320 and a second DR database 330). If the DR database 330 determines that the data is owned by at least two other databases, the DR database 330 may mark the data for deletion. In this way, the DR database 330 may cleanup its own data storage.

In other cases, database 320 may identify that identifier 340-*b* is now present in lookup table 335. Database 320 may store an indication that the data in data row 305-*b* was written to both DR databases 330-*a* and 330-*b* because identifier 340-*b* was not identified in lookup table 335 at the time of data replication. Based on the indication, database 320 may periodically search lookup table 335 to determine whether identifier 340-*b* has since been added to lookup table 335. If database 320 identifies identifier 340-*b* in lookup table 335, database 320 may determine one or more DR databases 330 indicated by identifier 340-*b*. Database 320 may send a message to any DR databases 330 that the data in data row 305-*b* was sent to that are not included in the one or more DR databases 330 indicated by identifier 340-*b*. The message may indicate to the DR databases 330 to mark the replicated version of data row 305-*b* for deletion. For example, database 320 may identify that identifier 340-*b* was added to lookup table 335, indicating DR database 330-*b*. Database 320 may send a cleanup message to DR database 330-*a* to mark the replicated version of data row 305-*b* for deletion. In response to the cleanup message, DR database 330-*a* may mark data row 305-*d* for deletion. In this way, data row 305-*b* will eventually be backed up at the proper DR database 330 indicated by identifier 340-*b* (e.g., DR database 330-*b*), and will not be backed up at other DR databases 330.

Figure 4:
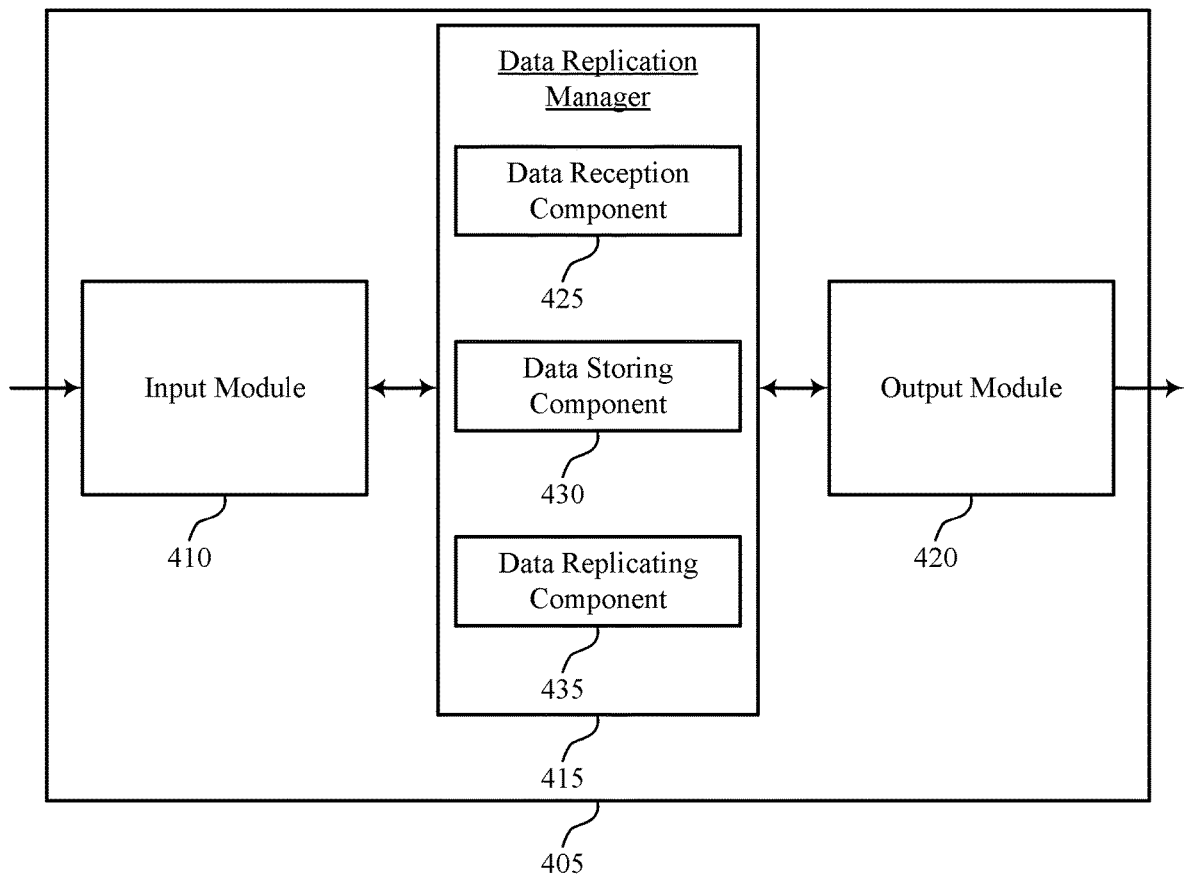
FIG. 4 illustrates a block diagram of a system that supports identifier based data replication in accordance with aspects of the present disclosure.

FIG. 4 shows a block diagram 400 of a system 405 that supports identifier based data replication in accordance with various aspects of the present disclosure. System 405 may include input module 410, data replication manager 415, and output module 420. System 405 may also include a processor. Each of these components may be in communication with one another (e.g., via one or more buses). In some cases, System 405 may be an example of a user terminal, a database server, or a system containing multiple computing devices. Data replication manager 415 may be an example of aspects of the data replication manager 615 described with reference to FIG. 6. Data replication manager 415 may also include data reception component 425, data storing component 430, and data replicating component 435.

Data replication manager 415 and/or at least some of its various sub-components may be implemented in hardware, software executed by a processor, firmware, or any combination thereof. If implemented in software executed by a processor, the functions of the data replication manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data replication manager 415 and/or at least some of its various sub-components may be physically located at various positions, including being distributed such that portions of functions are implemented at different physical locations by one or more physical devices. In some examples, data replication manager 415 and/or at least some of its various sub-components may be a separate and distinct component in accordance with various aspects of the present disclosure. In other examples, data replication manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Data reception component 425 may receive a first data block and a second data block at a first database server, where the first data block includes a first identifier and the second data block includes a second identifier. In some cases, data reception component 425 may receive a third data block at the first database server, where the third data block includes a third identifier. In some cases, the first identifier indicates a first tenant associated with the first data block, and the second identifier indicates a second tenant associated with the second data block. In some cases, the first data block and the second data block are arranged in a set of key-value pairs, and where the first identifier and the second identifier are stored in a key of the set of key-value pairs. In some cases, the first identifier and the second identifier are arranged first in the key of the set of key-value pairs.

Data storing component 430 may store the first data block, the second data block, and the third data block at the first database server. In some cases, the first database server includes a first server cluster, the second database server includes a second server cluster, and the third database server includes a third server cluster. In some cases, the first database server, the second database server, and the third database server each include an HBase database.

Data replicating component 435 may transmit a first backup request for the first data block to a second database server based on the first identifier, transmit a second backup request for the second data block to a third database server based on the second identifier, where the third database server is different from the second database server, and transmit a third backup request for the third data block to the second database server and the third database server based on the determination that a lookup table does not include the third identifier. In some cases, the first database server, the second database server, and the third database server are each located at different geographic locations.

Figure 5:
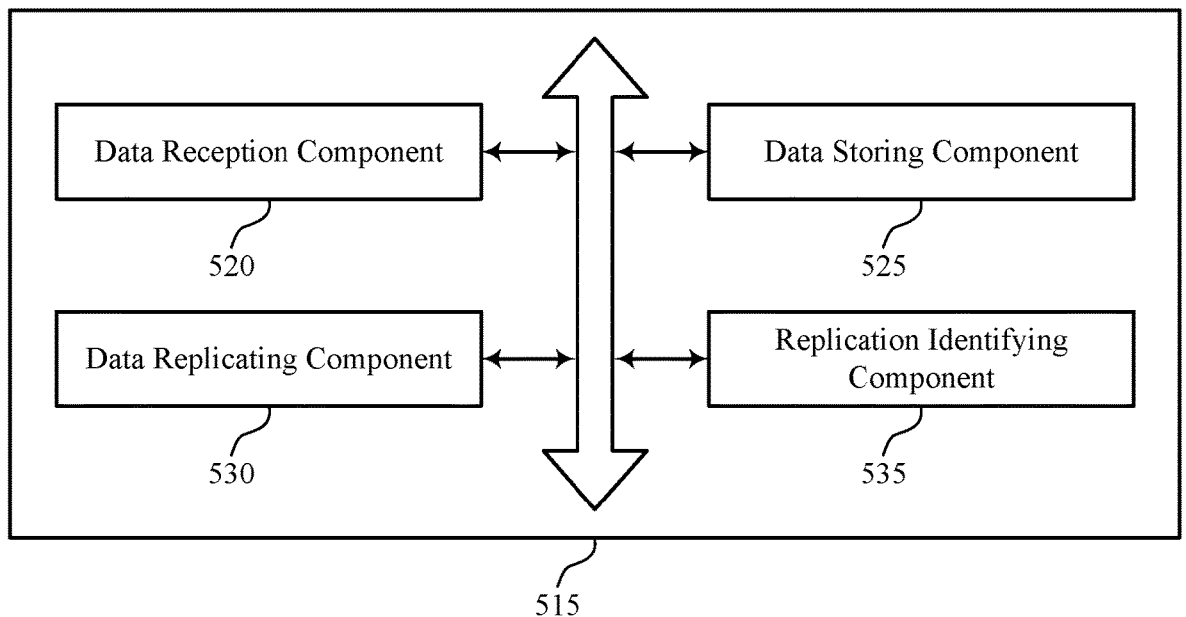
FIG. 5 illustrates a block diagram of a data replication manager that supports identifier based data replication in accordance with aspects of the present disclosure.

FIG. 5 shows a block diagram 500 of a data replication manager 515 that supports identifier based data replication in accordance with various aspects of the present disclosure. The data replication manager 515 may be an example of aspects of a data replication manager 415 or 615 as described with reference to FIGS. 4 and 6. The data replication manager 515 may include data reception component 520, data storing component 525, data replicating component 530, and replication identifying component 535. Each of these modules may communicate, directly or indirectly, with one another (e.g., via one or more buses).

Data reception component 425 may receive a first data block and a second data block at a first database server, where the first data block includes a first identifier and the second data block includes a second identifier. In some cases, data reception component 425 may receive a third data block at the first database server, where the third data block includes a third identifier. In some cases, the first identifier indicates a first tenant associated with the first data block, and the second identifier indicates a second tenant associated with the second data block. In some cases, the first data block and the second data block are arranged in a set of key-value pairs, and where the first identifier and the second identifier are stored in a key of the set of key-value pairs. In some cases, the first identifier and the second identifier are arranged first in the key of the set of key-value pairs.

Data storing component 430 may store the first data block, the second data block, and the third data block at the first database server. In some cases, the first database server includes a first server cluster, the second database server includes a second server cluster, and the third database server includes a third server cluster. In some cases, the first database server, the second database server, and the third database server each include an HBase database.

Data replicating component 435 may transmit a first backup request for the first data block to a second database server based on the first identifier, transmit a second backup request for the second data block to a third database server based on the second identifier, where the third database server is different from the second database server, and transmit a third backup request for the third data block to the second database server and the third database server based on the determination that a lookup table does not include the third identifier. In some cases, the first database server, the second database server, and the third database server are each located at different geographic locations.

In some cases, the transmitting the first backup request and the second backup request is based on the lookup table, where the lookup table includes the first identifier and the second identifier. Replication identifying component 535 may determine that the lookup table does not include the third identifier.

Figure 6:
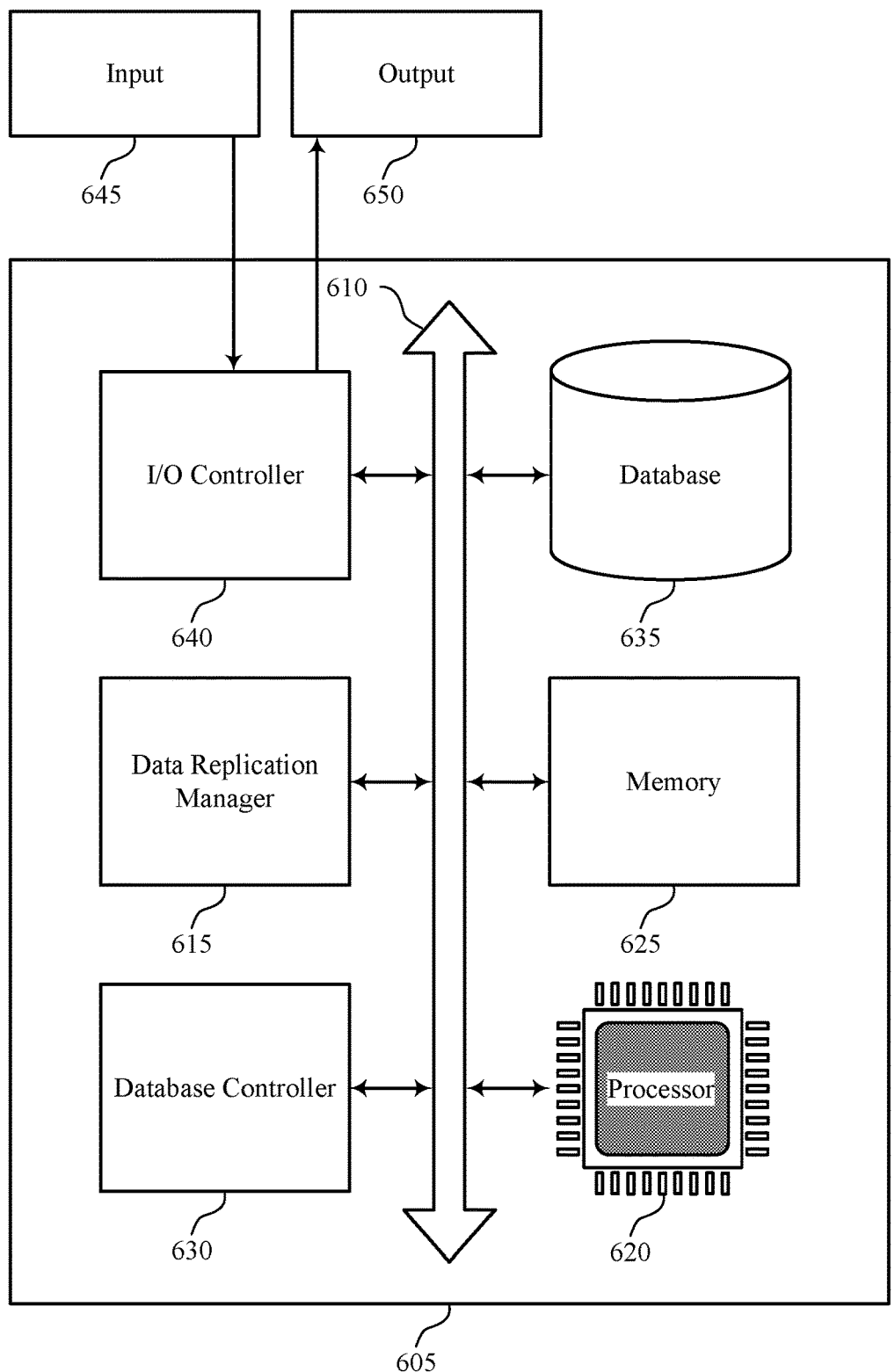
FIG. 6 illustrates a block diagram of an environment including a data replication manager that supports identifier based data replication in accordance with aspects of the present disclosure.

FIG. 6 shows a diagram of an environment 600 including a system 605 that supports identifier based data replication in accordance with various aspects of the present disclosure. System 605 may be an example of or include the components of system 125 as described above, e.g., with reference to FIG. 1. System 605 may include components for bi-directional data communications including components for transmitting and receiving communications, including data replication manager 615, processor 620, memory 625, database controller 630, database 635, and I/O controller 640. These components may be in electronic communication via one or more busses (e.g., bus 610).

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting identifier based data replication).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware and/or software operation such as the interaction with peripheral components or devices.

Database controller 630 may manage data storage and processing in database 635. In some cases, a user may interact with database controller 630. In other cases, database controller 630 may operate automatically without user interaction. Database 635 may be an example of a single database, a distributed database, multiple distributed databases, or an emergency backup database.

I/O controller 640 may manage input and output signals for device 605. I/O controller 640 may also manage peripherals not integrated into device 605. In some cases, I/O controller 640 may represent a physical connection or port to an external peripheral. In some cases, I/O controller 640 may utilize an operating system such as iOS®, ANDROID®, MS-DOS®, MS-WINDOWS®, OS/2®, UNIX®, LINUX®, or another known operating system. In other cases, I/O controller 640 may represent or interact with a modem, a keyboard, a mouse, a touchscreen, or a similar device. In some cases, I/O controller 640 may be implemented as part of a processor. In some cases, a user may interact with device 605 via I/O controller 640 or via hardware components controlled by I/O controller 640.

Figure 7:
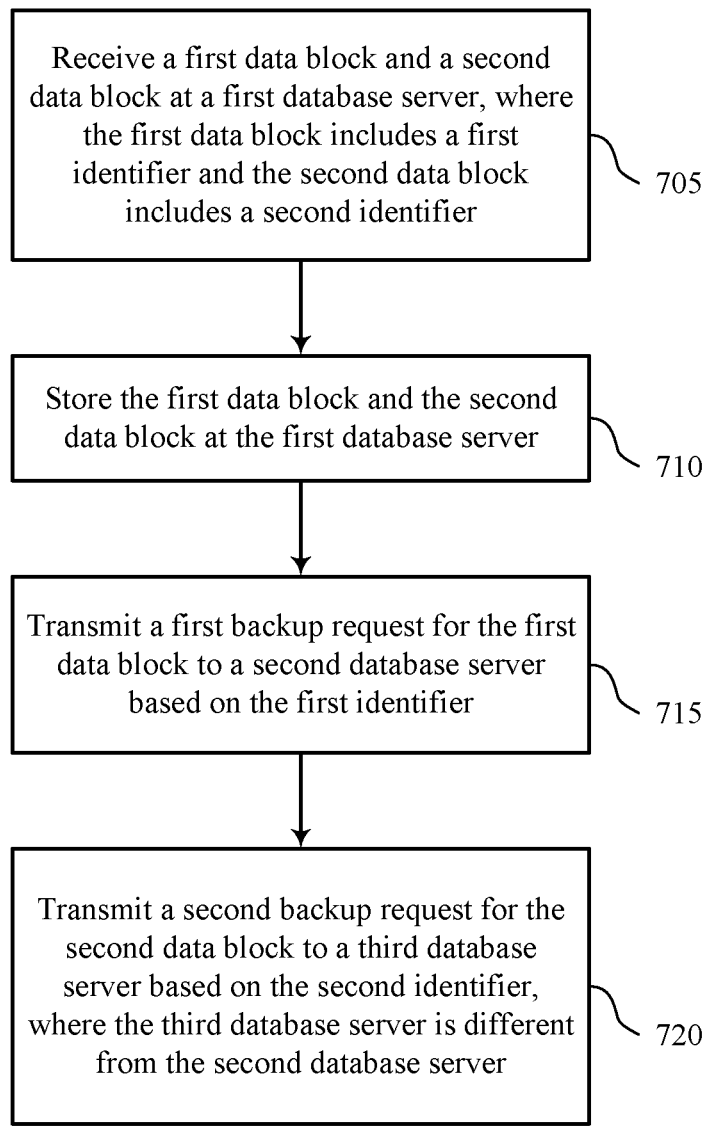
FIGS. 7 through 10 illustrate methods for identifier based data replication in accordance with aspects of the present disclosure.

FIG. 7 shows a flowchart illustrating a method 700 for identifier based data replication in accordance with various aspects of the present disclosure. The operations of method 700 may be implemented by a data replication manager or its components as described herein. For example, the operations of method 700 may be performed by a data replication manager 415, 515, or 615 as described with reference to FIGS. 4 through 6. In some examples, a data replication manager may execute a set of codes to control the functional elements of the device to perform the functions described below. Additionally or alternatively, the data replication manager may perform aspects of the functions described below using special-purpose hardware.

At block 705 the data replication manager 415, 515, or 615 may receive a first data block and a second data block at a first database server, wherein the first data block comprises a first identifier and the second data block comprises a second identifier. The operations of block 705 may be performed according to the methods described with reference to FIGS. 1 through 3. In certain examples, aspects of the operations of block 705 may be performed by a data reception component as described with reference to FIGS. 4 through 6.

At block 710 the data replication manager 415, 515, or 615 may store the first data block and the second data block at the first database server. The operations of block 710 may be performed according to the methods described with reference to FIGS. 1 through 3. In certain examples, aspects of the operations of block 710 may be performed by a data storing component as described with reference to FIGS. 4 through 6.

At block 715 the data replication manager 415, 515, or 615 may transmit a first backup request for the first data block to a second database server based at least in part on the first identifier. The operations of block 715 may be performed according to the methods described with reference to FIGS. 1 through 3. In certain examples, aspects of the operations of block 715 may be performed by a data replicating component as described with reference to FIGS. 4 through 6.

At block 720 the data replication manager 415, 515, or 615 may transmit a second backup request for the second data block to a third database server based at least in part on the second identifier, wherein the third database server is different from the second database server. The operations of block 720 may be performed according to the methods described with reference to FIGS. 1 through 3. In certain examples, aspects of the operations of block 720 may be performed by a data replicating component as described with reference to FIGS. 4 through 6.

Figure 8:
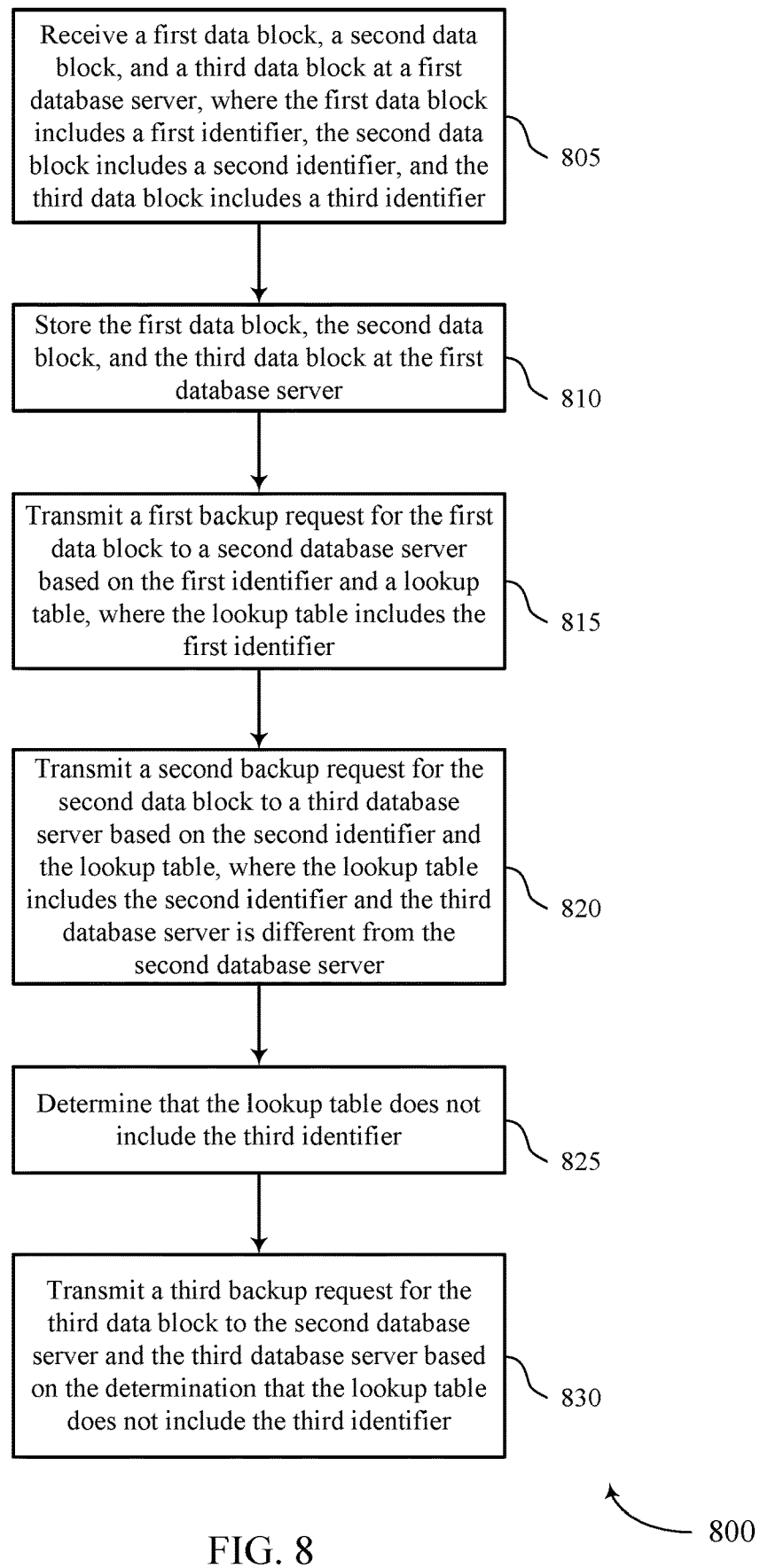

FIG. 8 shows a flowchart illustrating a method 800 for identifier based data replication in accordance with various aspects of the present disclosure. The operations of method 800 may be implemented by a data replication manager or its components as described herein. For example, the operations of method 800 may be performed by a data replication manager 415, 515, or 615 as described with reference to FIGS. 4 through 6. In some examples, a data replication manager may execute a set of codes to control the functional elements of the device to perform the functions described below. Additionally or alternatively, the data replication manager may perform aspects of the functions described below using special-purpose hardware.

At block 805 the data replication manager 415, 515, or 615 may receive a first data block, a second data block, and a third data block at a first database server, wherein the first data block comprises a first identifier, the second data block comprises a second identifier, and the third data block comprises a third identifier. The operations of block 805 may be performed according to the methods described with reference to FIGS. 1 through 3. In certain examples, aspects of the operations of block 805 may be performed by a data reception component as described with reference to FIGS. 4 through 6.

At block 810 the data replication manager 415, 515, or 615 may store the first data block, the second data block, and the third data block at the first database server. The operations of block 810 may be performed according to the methods described with reference to FIGS. 1 through 3. In certain examples, aspects of the operations of block 810 may be performed by a data storing component as described with reference to FIGS. 4 through 6.

At block 815 the data replication manager 415, 515, or 615 may transmit a first backup request for the first data block to a second database server based at least in part on the first identifier. In some cases, the transmitting the first backup request is based at least in part on a lookup table, wherein the lookup table includes the first identifier. The operations of block 815 may be performed according to the methods described with reference to FIGS. 1 through 3. In certain examples, aspects of the operations of block 815 may be performed by a data replicating component as described with reference to FIGS. 4 through 6.

At block 820 the data replication manager 415, 515, or 615 may transmit a second backup request for the second data block to a third database server based at least in part on the second identifier, wherein the third database server is different from the second database server. In some cases, the transmitting the second backup request is based at least in part on the lookup table, wherein the lookup table includes the second identifier. The operations of block 820 may be performed according to the methods described with reference to FIGS. 1 through 3. In certain examples, aspects of the operations of block 820 may be performed by a data replicating component as described with reference to FIGS. 4 through 6.

At block 825 the data replication manager 415, 515, or 615 may determine that the lookup table does not include the third identifier. The operations of block 825 may be performed according to the methods described with reference to FIGS. 1 through 3. In certain examples, aspects of the operations of block 825 may be performed by a replication identifying component as described with reference to FIGS. 4 through 6.

At block 830 the data replication manager 415, 515, or 615 may transmit a third backup request for the third data block to the second database server and the third database server based at least in part on the determination that the lookup table does not include the third identifier. The operations of block 830 may be performed according to the methods described with reference to FIGS. 1 through 3. In certain examples, aspects of the operations of block 830 may be performed by a data replicating component as described with reference to FIGS. 4 through 6.

Figure 9:
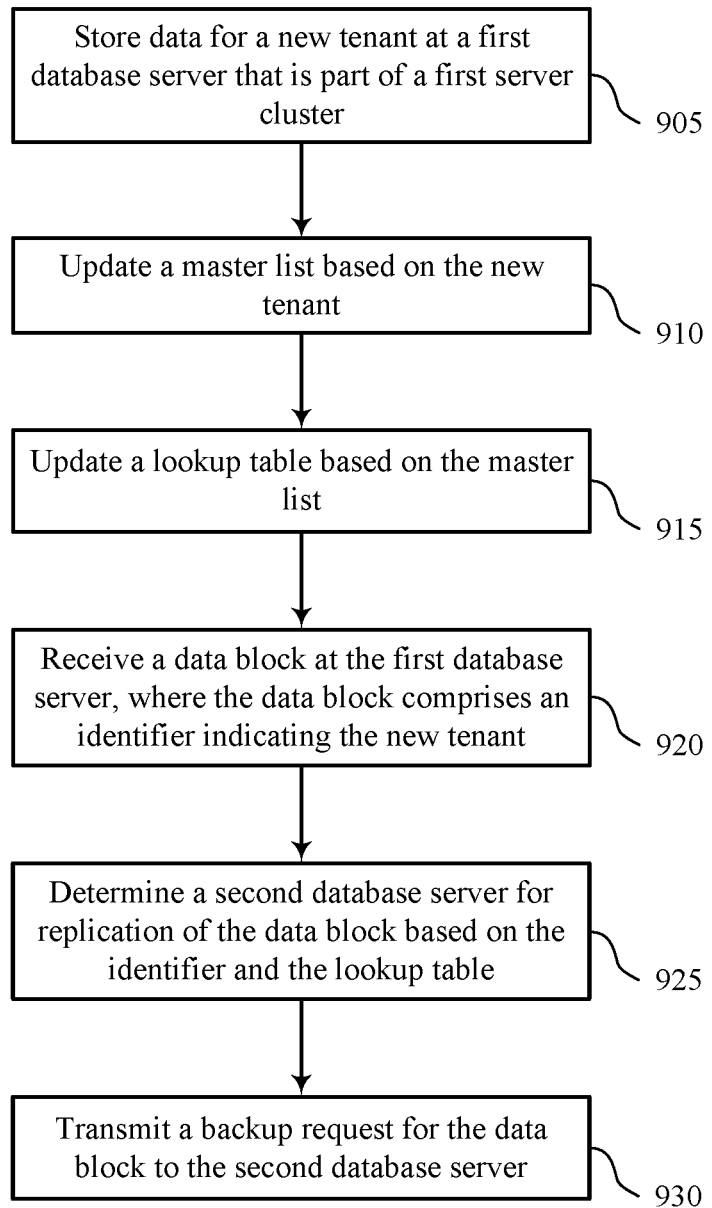

FIG. 9 shows a flowchart illustrating a method 900 for identifier based data replication in accordance with various aspects of the present disclosure. The operations of method 900 may be implemented by a data replication manager or its components as described herein. For example, the operations of method 900 may be performed by a data replication manager 415, 515, or 615 as described with reference to FIGS. 4 through 6. In some examples, a data replication manager may execute a set of codes to control the functional elements of the device to perform the functions described below. Additionally or alternatively, the data replication manager may perform aspects of the functions described below using special-purpose hardware.

At block 905 the data replication manager 415, 515, or 615 may store data for a new tenant at a first database server (i.e., a primary database). The first database server may be a component of a first server cluster. The server cluster may include additional tenants. The operations of block 905 may be performed according to the methods described with reference to FIGS. 1 through 3. In certain examples, aspects of the operations of block 905 may be performed by a data reception component as described with reference to FIGS. 4 through 6.

At block 910 the data replication manager 415, 515, or 615 may update a master list based on the new tenant. In some cases, the data replication manager 415, 515, or 615 may automatically update the master list following the onboarding of the new tenant. In other cases, the updating may be based on a user input. The updating may include adding the new tenant to the master list, along with an indication of a second database server. The indication may specify the second database server as a DR site for data associated with the new tenant. In some cases, the indication may indicate multiple database servers for data replication. The operations of block 910 may be performed according to the methods described with reference to FIGS. 1 through 3. In certain examples, aspects of the operations of block 910 may be performed by a replication identifying component as described with reference to FIGS. 4 through 6.

At block 915 the data replication manager 415, 515, or 615 may update a lookup table based on the master list. In some cases, the lookup table may periodically search the master list, and add any tenants and corresponding indications to one or more database servers that are not present in the lookup table. The lookup table may store an identifier associated with the new tenant, as well as an indicator associating the second database server to the new tenant. The operations of block 915 may be performed according to the methods described with reference to FIGS. 1 through 3. In certain examples, aspects of the operations of block 915 may be performed by a replication identifying component as described with reference to FIGS. 4 through 6.

At block 920 the data replication manager 415, 515, or 615 may receive a data block at the first database server. The data block may comprise an identifier indicating that the data block is associated with the new tenant. The first database server may store the data block. The operations of block 920 may be performed according to the methods described with reference to FIGS. 1 through 3. In certain examples, aspects of the operations of block 920 may be performed by a data reception component as described with reference to FIGS. 4 through 6.

At block 925 the data replication manager 415, 515, or 615 may determine a database server (e.g., the second database server) for replication of the data block based on the identifier and the lookup table. For example, the data replication manager 415, 515, or 615 may search the lookup table for the identifier of the data block, and may identify the associated database server for data replication indicated by the identifier. The operations of block 925 may be performed according to the methods described with reference to FIGS. 1 through 3. In certain examples, aspects of the operations of block 925 may be performed by a replication identifying component as described with reference to FIGS. 4 through 6.

At block 930 the data replication manager 415, 515, or 615 may transmit a backup request for the data block to the second database server. The second database server may be a component of a second server cluster, and may be located at a different physical location than the first database server. The backup request may include an instance of the data block to be stored at the second database server for DR. The operations of block 930 may be performed according to the methods described with reference to FIGS. 1 through 3. In certain examples, aspects of the operations of block 930 may be performed by a data replicating component as described with reference to FIGS. 4 through 6.

Figure 10:
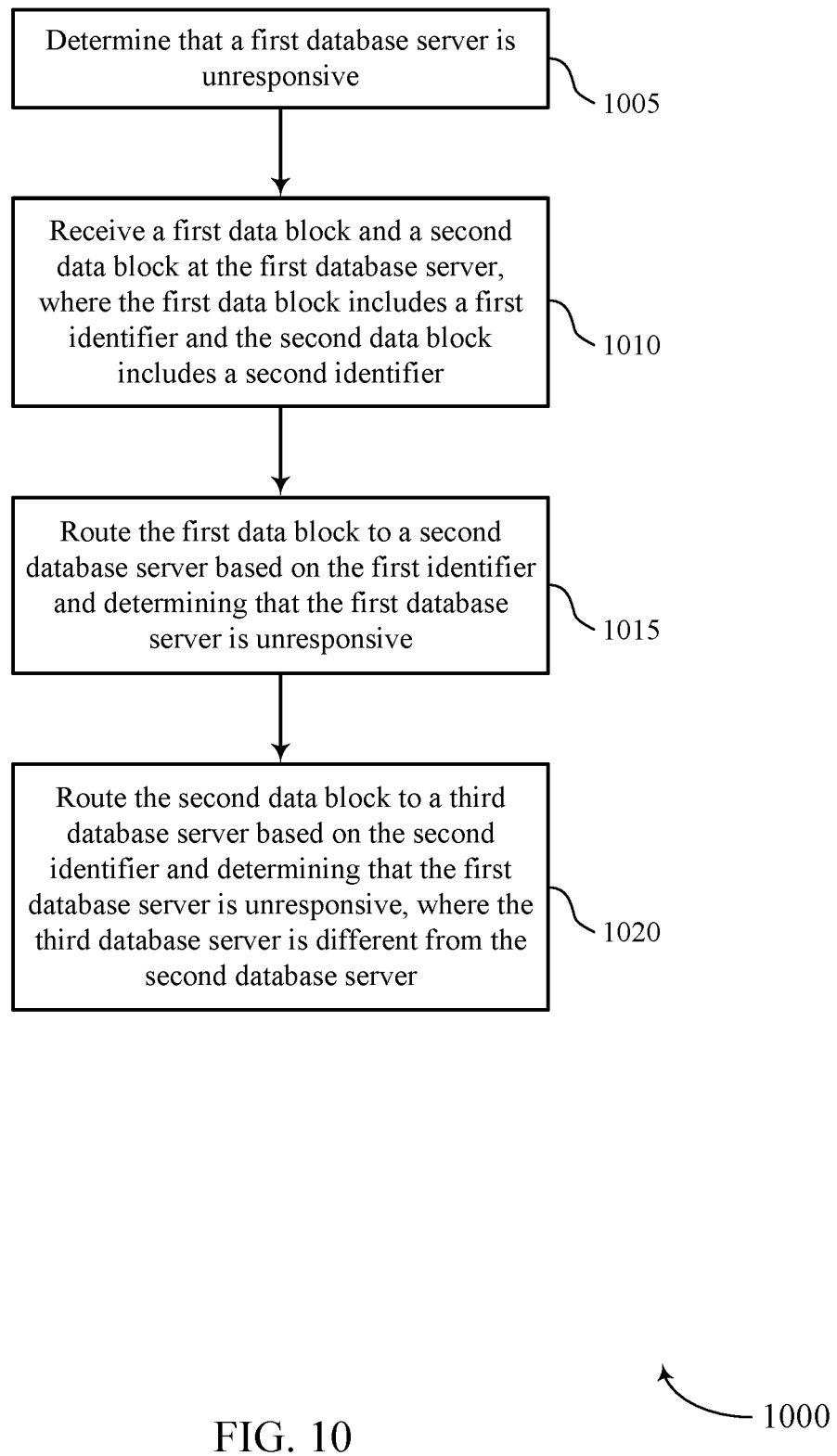

FIG. 10 shows a flowchart illustrating a method 1000 for identifier based data replication in accordance with various aspects of the present disclosure. The operations of method 1000 may be implemented by a data replication manager or its components as described herein. For example, the operations of method 1000 may be performed by a data replication manager 415, 515, or 615 as described with reference to FIGS. 4 through 6. In some examples, a data replication manager may execute a set of codes to control the functional elements of the device to perform the functions described below. Additionally or alternatively, the data replication manager may perform aspects of the functions described below using special-purpose hardware.

At block 1005 the data replication manager 415, 515, or 615 may determine that a first database server is unresponsive. The first database server may be an example of a primary database for one or more tenants, and may be a component of a first server cluster. In some cases, the first database server may be unresponsive due to a catastrophic failure at the data center level. The operations of block 1005 may be performed according to the methods described with reference to FIGS. 1 through 3. In certain examples, aspects of the operations of block 1005 may be performed by a replication identifying component as described with reference to FIGS. 4 through 6.

At block 1010 the data replication manager 415, 515, or 615 may receive a first data block and a second data block at the first database server, where the first data block includes a first identifier and the second data block includes a second identifier. The first data block and the second data block may not be stored at the first database server due to the first database server being unresponsive. In some cases, one or more servers that are components of the first server cluster may also be unresponsive. In these cases, the first data block and second data block may additionally miss processing by the one or more servers. The operations of block 1010 may be performed according to the methods described with reference to FIGS. 1 through 3. In certain examples, aspects of the operations of block 1010 may be performed by a data reception component as described with reference to FIGS. 4 through 6.

At block 1015 the data replication manager 415, 515, or 615 may route the first data block to a second database server. The routing may be based on determining that the first database server is unresponsive. The data replication manager 415, 515, or 615 may determine to route the first data block to the second database server based on the first identifier. In some cases, a master list or lookup table may indicate that data with the first identifier may be replicated to the second database server. The routing may also be based on domain name system (DNS) techniques. The second database server may store the first data block. The second database server may be a component of a second server cluster, and other servers of the second server cluster may process the first data block. The operations of block 1015 may be performed according to the methods described with reference to FIGS. 1 through 3. In certain examples, aspects of the operations of block 1015 may be performed by a data replicating component as described with reference to FIGS. 4 through 6.

At block 1020 the data replication manager 415, 515, or 615 may route the second data block to a third database server, where the third database server is different from the second database server. The routing may be based on determining that the first database server is unresponsive. The data replication manager 415, 515, or 615 may determine to route the second data block to the third database server based on the second identifier. In some cases, the master list or lookup table may indicate that data with the second identifier may be replicated to the third database server. The routing may also be based on DNS techniques. The third database server may store the second data block. The third database server may be a component of a third server cluster, and other servers of the third server cluster may process the second data block. In this way, the processing load of the first database server may be distributed to multiple backup or DR database servers when the first database server fails. The operations of block 1020 may be performed according to the methods described with reference to FIGS. 1 through 3. In certain examples, aspects of the operations of block 1020 may be performed by a data replicating component as described with reference to FIGS. 4 through 6.

A method of data storage is described. The method may include receiving a first data block and a second data block at a first database server, wherein the first data block comprises a first identifier and the second data block comprises a second identifier, storing the first data block and the second data block at the first database server, transmitting a first backup request for the first data block to a second database server based at least in part on the first identifier, and transmitting a second backup request for the second data block to a third database server based at least in part on the second identifier, wherein the third database server is different from the second database server.

Another apparatus for data storage is described. The apparatus may include a processor, memory in electronic communication with the processor, and instructions stored in the memory. The instructions may be operable to cause the processor to receive a first data block and a second data block at a first database server, wherein the first data block comprises a first identifier and the second data block comprises a second identifier, store the first data block and the second data block at the first database server, transmit a first backup request for the first data block to a second database server based at least in part on the first identifier, and transmit a second backup request for the second data block to a third database server based at least in part on the second identifier, wherein the third database server is different from the second database server.

A non-transitory computer readable medium for data storage is described. The non-transitory computer-readable medium may include instructions operable to cause a processor to receive a first data block and a second data block at a first database server, wherein the first data block comprises a first identifier and the second data block comprises a second identifier, store the first data block and the second data block at the first database server, transmit a first backup request for the first data block to a second database server based at least in part on the first identifier, and transmit a second backup request for the second data block to a third database server based at least in part on the second identifier, wherein the third database server is different from the second database server.

In some examples of the method, apparatus, and non-transitory computer-readable medium described above, the first database server, the second database server, and the third database server may be each located at different geographic locations.

In some examples of the method, apparatus, and non-transitory computer-readable medium described above, the first identifier indicates a first tenant associated with the first data block, and the second identifier indicates a second tenant associated with the second data block.

In some examples of the method, apparatus, and non-transitory computer-readable medium described above, the first data block and the second data block may be arranged in a plurality of key-value pairs, and wherein the first identifier and the second identifier may be stored in a key of the plurality of key-value pairs.

In some examples of the method, apparatus, and non-transitory computer-readable medium described above, the first identifier and the second identifier may be arranged first in the key of the plurality of key-value pairs.

In some examples of the method, apparatus, and non-transitory computer-readable medium described above, the first database server comprises a first server cluster, the second database server comprises a second server cluster, and the third database server comprises a third server cluster.

In some examples of the method, apparatus, and non-transitory computer-readable medium described above, the transmitting the first backup request and the second backup request may be based at least in part on a lookup table, wherein the lookup table includes the first identifier and the second identifier.

Some examples of the method, apparatus, and non-transitory computer-readable medium described above may further include processes, features, means, or instructions for receiving a third data block at the first database server, wherein the third data block comprises a third identifier. Some examples of the method, apparatus, and non-transitory computer-readable medium described above may further include processes, features, means, or instructions for storing the third data block at the first database server. Some examples of the method, apparatus, and non-transitory computer-readable medium described above may further include processes, features, means, or instructions for determining that the lookup table does not include the third identifier.

Some examples of the method, apparatus, and non-transitory computer-readable medium described above may further include processes, features, means, or instructions for transmitting a third backup request for the third data block to the second database server and the third database server based at least in part on the determination that the lookup table does not include the third identifier.

In some examples of the method, apparatus, and non-transitory computer-readable medium described above, the first database server, the second database server, and the third database server each comprise an HBase database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data storage, comprising:
   receiving a first data block, a second data block and a third data block at a first database server, wherein the first data block comprises a first identifier, the second data block comprises a second identifier and the third data block comprises a third identifier;

storing the first data block, the second data block and the third data block at the first database server;
determining a second database server based at least in part on a lookup table including a correlation between the first identifier and the second database server;
determining a third database server based at least in part on the lookup table including a correlation between the second identifier and the third database server;
transmitting a first backup request for the first data block to the second database server;
transmitting a second backup request for the second data block to the third database server, wherein the third database server is different from the second database server; and
transmitting a third backup request for the third data block to the second database server and the third database server based at least in part on a determination that the lookup table does not include the third identifier.

2. The method of claim 1, wherein the first database server, the second database server, and the third database server are each located at different geographic locations.

3. The method of claim 1, wherein the first identifier indicates a first tenant associated with the first data block, and the second identifier indicates a second tenant associated with the second data block.

4. The method of claim 1, wherein the first data block and the second data block are arranged in a plurality of key-value pairs, and wherein the first identifier and the second identifier are stored in a key of the plurality of key-value pairs.

5. The method of claim 4, wherein the first identifier and the second identifier are arranged first in the key of the plurality of key-value pairs.

6. The method of claim 1, wherein the first database server comprises a first server cluster, the second database server comprises a second server cluster, and the third database server comprises a third server cluster.

7. The method of claim 1, wherein transmitting the first backup request and the second backup request is based at least in part on the lookup table, wherein the lookup table includes the first identifier and the second identifier.

8. The method of claim 1, wherein the first database server, the second database server, and the third database server each comprise an HBase database.

9. An apparatus for data storage, in a system comprising:
a processor;
memory in electronic communication with the processor; and
instructions stored in the memory and operable, when executed by the processor, to cause the apparatus to:
receive a first data block, a second data block and a third data block at a first database server, wherein the first data block comprises a first identifier, the second data block comprises a second identifier and the third data block comprises a third identifier;
store the first data block, the second data block and the third data block at the first database server;
determine a second database server based at least in part on a lookup table including a correlation between the first identifier and the second database server;
determine a third database server based at least in part on the lookup table including a correlation between the second identifier and the third database server;
transmit a first backup request for the first data block to the second database server;
transmit a second backup request for the second data block to the third database server, wherein the third database server is different from the second database server; and
transmit a third backup request for the third data block to the second database server and the third database server based at least in part on a determination that the lookup table does not include the third identifier.

10. The apparatus of claim 9, wherein the first database server, the second database server, and the third database server are each located at different geographic locations.

11. The apparatus of claim 9, wherein the first identifier indicates a first tenant associated with the first data block, and the second identifier indicates a second tenant associated with the second data block.

12. The apparatus of claim 9, wherein the first data block and the second data block are arranged in a plurality of key-value pairs, and wherein the first identifier and the second identifier are stored in a key of the plurality of key-value pairs.

13. The apparatus of claim 9, wherein the first database server comprises a first server cluster, the second database server comprises a second server cluster, and the third database server comprises a third server cluster.

14. The apparatus of claim 9, wherein transmitting the first backup request and the second backup request is based at least in part on the lookup table, wherein the lookup table includes the first identifier and the second identifier.

15. The apparatus of claim 9, wherein the first database server, the second database server, and the third database server each comprise an HBase database.

16. A non-transitory computer readable medium storing code for data storage, the code comprising instructions executable by a processor to:
receive a first data block, a second data block and a third data block at a first database server, wherein the first data block comprises a first identifier, the second data block comprises a second identifier and the third data block comprises a third identifier;
store the first data block, the second data block and the third data block at the first database server;
determine a second database server based at least in part on a lookup table including a correlation between the first identifier and the second database server;
determine a third database server based at least in part on the lookup table including a correlation between the second identifier and the third database server;
transmit a first backup request for the first data block to the second database server;
transmit a second backup request for the second data block to the third database server, wherein the third database server is different from the second database server; and
transmit a third backup request for the third data block to the second database server and the third database server based at least in part on a determination that the lookup table does not include the third identifier.

17. The non-transitory computer-readable medium of claim 16, wherein the first database server, the second database server, and the third database server are each located at different geographic locations.

18. The non-transitory computer-readable medium of claim 16, wherein the first identifier indicates a first tenant associated with the first data block, and the second identifier indicates a second tenant associated with the second data block.

19. The non-transitory computer-readable medium of claim 16, wherein the first data block and the second data block are arranged in a plurality of key-value pairs, and wherein the first identifier and the second identifier are stored in a key of the plurality of key-value pairs.

20. The non-transitory computer-readable medium of claim 16, wherein the first database server comprises a first server cluster, the second database server comprises a second server cluster, and the third database server comprises a third server cluster.

* * * * *